United States Patent
Bisaiji

(10) Patent No.: US 8,336,293 B2
(45) Date of Patent: Dec. 25, 2012

(54) EXHAUST GAS PURIFICATION SYSTEM OF AN INTERNAL COMBUSTION ENGINE

(75) Inventor: Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/677,711

(22) PCT Filed: Jun. 26, 2009

(86) PCT No.: PCT/JP2009/061773
§ 371 (c)(1),
(2), (4) Date: Mar. 11, 2010

(87) PCT Pub. No.: WO2010/150408
PCT Pub. Date: Dec. 29, 2010

(65) Prior Publication Data
US 2012/0085084 A1    Apr. 12, 2012

(51) Int. Cl.
*F01N 3/00* (2006.01)
(52) U.S. Cl. .................. 60/277; 60/276; 60/285
(58) Field of Classification Search .......... 60/274, 60/276, 277, 285, 297, 301
See application file for complete search history.

(56) References Cited

U.S. PATENT DOCUMENTS

| | | | | |
|---|---|---|---|---|
| 5,937,638 A * | 8/1999 | Akazaki et al. | ............. | 60/274 |
| 6,850,165 B2 * | 2/2005 | Sakanushi et al. | ............. | 340/633 |
| 7,059,120 B2 * | 6/2006 | Nakagawa et al. | ............. | 60/289 |
| 7,513,105 B2 * | 4/2009 | Kato | ............. | 60/277 |
| 8,151,552 B2 * | 4/2012 | Iida | ............. | 60/277 |
| 2002/0197721 A1 | 12/2002 | Kinugawa et al. | | |
| 2004/0006971 A1 | 1/2004 | Kamoto et al. | | |
| 2009/0145109 A1 | 6/2009 | Kidokoro et al. | | |

FOREIGN PATENT DOCUMENTS

JP    A-06-010738    1/1994
(Continued)

OTHER PUBLICATIONS

International Search Report issued in International Application No. PCT/JP2009/061773; Mailed on Sep. 29, 2009 (With Translation).

*Primary Examiner* — Binh Q Tran
(74) *Attorney, Agent, or Firm* — Oliff & Berridge, PLC

(57) ABSTRACT

In an exhaust gas purification system provided with two or more exhaust gas purification devices each having an oxygen occlusion ability arranged in series in an exhaust passage, a technique is provided in which the degradation of each of the exhaust gas purification devices can be detected in a distinguished manner with a simple structure. In an exhaust gas purification system having an NSR and a filter with an oxygen occlusion ability arranged in series from an upstream side, an NSR outflow gas air fuel ratio is estimated based on an NSR inflow gas air fuel ratio and an oxygen occlusion ability in the NSR, and a filter outflow gas air fuel ratio is estimated based on the NSR outflow gas air fuel ratio (filter inflow gas air fuel ratio) and an oxygen occlusion ability in the filter. Further, a filter outflow gas air fuel ratio is detected, and the degradation of the NSR and the degradation of the filter are determined in a distinguished manner based on the estimated NSR outflow gas air fuel ratio, the estimated filter outflow gas air fuel ratio, and the actually detected filter outflow gas air fuel ratio.

16 Claims, 10 Drawing Sheets

FOREIGN PATENT DOCUMENTS

| | | |
|---|---|---|
| JP | A-2001-234788 | 8/2001 |
| JP | A-2003-106140 | 4/2003 |
| JP | A-2003-301717 | 10/2003 |
| JP | A-2004-044450 | 2/2004 |
| JP | A-2005-240758 | 9/2005 |
| JP | A-2009-138604 | 6/2009 |

* cited by examiner

US 8,336,293 B2

EXHAUST GAS PURIFICATION SYSTEM OF AN INTERNAL COMBUSTION ENGINE

TECHNICAL FIELD

The present invention relates to an exhaust gas purification system of an internal combustion engine.

BACKGROUND ART

Harmful substances such as NOx are contained in the exhaust gases of internal combustion engines. In order to reduce the emission of these harmful substances, it has been known that in an exhaust system of an internal combustion engine, there is arranged an occlusion reduction type NOx catalyst which occludes (including "absorbs" and "adsorbs") the NOx in an exhaust gas in a state where the air fuel ratio of the exhaust gas is lean, and at the same time releases and reduces the NOx thus occluded in a state where the air fuel ratio of the exhaust gas is rich. In this technique, the purification capacity of the catalyst decreases as the amount of NOx occluded (including "absorbed" and "adsorbed") increases, so by performing enrich control on the air fuel ratio of the exhaust gas, a reducing agent is supplied to the occlusion reduction type NOx catalyst, whereby the NOx occluded in the catalyst is released and reduced (hereinafter referred to as a "NOx reduction treatment").

In addition, in order to eliminate SOx poisoning in which the SOx in an exhaust gas is occluded to an occlusion reduction type NOx catalyst thereby to lower the purification capacity thereof, the bed temperature of the occlusion reduction type NOx catalyst may be caused to rise, and at the same time a reducing agent may be supplied (hereinafter referred to as "SOx poisoning recovery processing"), and in this SOx poisoning recovery processing, too, the reducing agent is supplied to the occlusion reduction type NOx catalyst according to the enrich control of the air fuel ratio of the exhaust gas.

Also, particulate matters (PM) having carbon as a principal component thereof is contained in the exhaust gas of an internal combustion engine. In order to prevent the emission of these particulate matters to atmospheric air, there has been known a technique of arranging a particulate filter (hereinafter referred to as a "filter") for collecting the particulate matters in an exhaust system of an internal combustion engine.

In addition, in the above-mentioned filter, there may be one in which an oxygen occlusion material such as ceria, alkaline earth metals, etc., and a catalyst precious metal such as Pt are supported thereon so as to provide an oxygen occlusion ability. Such a filter performs not only the function of collecting particulate matters, but also the function of occluding (including "adsorbing and absorbing") the oxygen in an exhaust gas when the air fuel ratio of the exhaust gas is lean, and releasing the occluded oxygen to the exhaust gas when the air fuel ratio of the exhaust gas becomes rich. Then, the filter performs the oxidation purification of the CO and HC in the exhaust gas by the use of the oxygen thus released. Accordingly, it is possible to consume and purify the HC and CO in the exhaust gas of a rich atmosphere by means of the filter having this oxygen occlusion function (hereinafter also referred to as an OSC (oxygen storage capacity) function).

In the exhaust system of an internal combustion engine, there may be provided a plurality of exhaust gas purification devices such as the above-mentioned occlusion reduction type NOx catalyst and the filter having an OSC function, etc., that are arranged in series with one another. In such a case, it may be necessary to determine the degradation in function of the occlusion reduction type NOx catalyst and the filter with an OSC function.

In relation to the technique of determining the degradation of an exhaust gas purification device(s), there has been well known a technique in which the degradation diagnosis of a NOx trap catalyst, which is inserted in an exhaust passage for trapping NOx therein in an oxidizing atmosphere, is performed based on a period of time after the air fuel ratio of an exhaust gas in the upstream side of the catalyst has become rich until when the air fuel ratio thereof in the downstream side of the catalyst becomes rich during the control in which the NOx trapped is reduced and purified (see, for example, a first patent document).

In addition, there has also been known a technique in which a difference between the amounts of generated heat per unit flow rate of combustibles generated by the reactions of the combustibles and others in a catalyst casing of a catalytic converter is calculated from the temperatures of an exhaust gas at the upstream and downstream sides of a catalyst that oxidizes the combustibles in the exhaust gas of an engine and an atmospheric temperature, and when the number of determinations that the difference is equal to or less than a preset determination value becomes equal to or more than a prescribed number of times, it is determined that the catalyst is in a degraded state (see, for example, a second patent document).

In the above-mentioned conventional techniques, however, there has been a problem that it is difficult to determine the degradation of the function of each of a plurality of exhaust gas purification devices such as NOx occlusion reduction type catalysts, filters with an OSC function, etc., in a distinguished manner. In addition, in order to determine the degradation of the function of each of the plurality of exhaust gas purification devices in a distinguished manner, there has been a further problem of an increase in the device cost due to the provision of sensors one for each of the exhaust gas purification devices.

PRIOR ART REFERENCES

[Patent Documents]
   [First Patent Document] Japanese patent application laid-open No. 2005-240758
   [Second Patent Document] Japanese patent application laid-open No. 2003-106140

SUMMARY OF THE INVENTION

Problems to be Solved by the Invention

The object of the present invention is to provide a technique in which in an exhaust gas purification system provided with two or more exhaust gas purification devices each having an oxygen occlusion ability arranged in series in an exhaust passage, the degradation of each of the exhaust gas purification devices can be detected in a distinguished manner with a simple structure.

Means for Solving the Problems

The present invention to achieve the above-mentioned object resides, as its greatest feature, in an exhaust gas purification system having a first exhaust gas purification device and a second exhaust gas purification device each having an oxygen occlusion ability arranged in series with each other from an upstream side, and is characterized by estimating an air fuel ratio at the downstream side of the first exhaust gas purification device based on an air fuel ratio at the upstream side of the first exhaust gas purification device and an oxygen occlusion ability in the first exhaust gas purification device, estimating an air fuel ratio at the downstream side of the second exhaust gas purification device based on an air fuel ratio at the upstream side of the second exhaust gas purification device and an oxygen occlusion ability in the second exhaust gas purification device, further detecting the air fuel ratio at the downstream side of the second exhaust gas purification device, and determining the degradation of the first exhaust gas purification device and the degradation of the second exhaust gas purification device in a distinguished manner based on the estimated air fuel ratio at the downstream side of the first exhaust gas purification device, the estimated air fuel ratio at the downstream side of the second exhaust gas purification device, and the detected air fuel ratio at the downstream of the second exhaust gas purification device.

More specifically, the system is characterized by comprising:

a first exhaust gas purification device that is arranged in an exhaust passage of an internal combustion engine and has an oxygen occlusion ability;

a second exhaust gas purification device that is arranged in said exhaust passage at the downstream side of said first exhaust gas purification device and has an oxygen occlusion ability;

an upstream air fuel ratio acquisition unit that acquires the air fuel ratio of an exhaust gas at the upstream side of said first exhaust gas purification device in said exhaust passage;

a downstream air fuel ratio detection unit which is arranged in said exhaust passage at the downstream side of said second exhaust gas purification device, and detects the air fuel ratio of an exhaust gas from said second exhaust gas purification device;

a first air fuel ratio estimation unit that estimates the air fuel ratio of an exhaust gas between said first exhaust gas purification device and said second exhaust gas purification device at the time when said first exhaust gas purification device is normal, based on the air fuel ratio of the exhaust gas at the upstream side of said first exhaust gas purification device acquired by said upstream air fuel ratio acquisition unit, and the oxygen occlusion ability of said first exhaust gas purification device in its normal operation;

a second air fuel ratio estimation unit that estimates the air fuel ratio of an exhaust gas at the downstream side of said second exhaust gas purification device at the time when both said first exhaust gas purification device and said second exhaust gas purification device are normal, based on the air fuel ratio estimated by said first air fuel ratio estimation unit and the oxygen occlusion ability of said second exhaust gas purification device in its normal operation; and a determination unit that determines the degradation of said first exhaust gas purification device and the degradation of said second exhaust gas purification device in a distinguished manner based on the air fuel ratio estimated by said first air fuel ratio estimation unit, the air fuel ratio estimated by said second air fuel ratio estimation unit, and the air fuel ratio detected by said downstream air fuel ratio detection unit.

In the present invention, by means of the first and second air fuel ratio estimation units, the air fuel ratios of the exhaust gas at the downstream side of the individual exhaust gas purification devices at the time when the oxygen occlusion abilities of the individual exhaust gas purification devices are normal are estimated from the air fuel ratios of the exhaust gas at the upstream side of the first and second exhaust gas purification devices, and the oxygen occlusion abilities of the individual exhaust gas purification devices in their normal operations, respectively.

Then, comparisons are made among the air fuel ratio of the exhaust gas in the exhaust passage between the first exhaust gas purification device and the second exhaust gas purification device estimated by the first air fuel ratio estimation unit, the air fuel ratio of the exhaust gas in the exhaust passage at the downstream side of the second exhaust gas purification device estimated by the second air fuel ratio estimation unit, and the air fuel ratio of the exhaust gas in the exhaust passage at the downstream side of the second exhaust gas purification device detected by the downstream air fuel ratio detection unit. Moreover, a change of the air fuel ratio before and after the first exhaust gas purification device and a change of the air fuel ratio before and after the second exhaust gas purification device are derived, and it is determined whether the air fuel ratio in each of the exhaust gas purification devices changes as expected. According to this, the degradation of said first exhaust gas purification device and the degradation of said second exhaust gas purification device can be determined in a distinguished manner.

Here, the downstream air fuel ratio detection unit is a detection unit that is originally required for the control of the air fuel ratio in the exhaust gas purification system, so according to the present invention, it becomes possible to detect the degradation of the first exhaust gas purification device and the degradation of the second exhaust gas purification device in a distinguished manner with a simple construction without the need of new sensors or the like. Here, note that in the present invention, the oxygen occlusion ability means a function to occlude (including absorb and adsorb) oxygen in a state where the air fuel ratio of the exhaust gas is lean and to release oxygen in a state where the air fuel ratio of the exhaust gas is rich, and also means to include a NOx occlusion reduction function to occlude (including absorb and adsorb) NOx (including oxygen) in a state where the air fuel ratio of the exhaust gas is lean and to release NOx in a state where the air fuel ratio of the exhaust gas is rich.

In addition, in the present invention, in a case where a predetermined air fuel ratio difference derived from a difference between the air fuel ratio estimated by said first air fuel ratio estimation unit and the air fuel ratio detected by said downstream air fuel ratio detection unit is equal to or less than a predetermined threshold, said determination unit may make a determination that said second exhaust gas purification device has degraded.

That is, the case where the difference between the air fuel ratio estimated by the first air fuel ratio estimation unit and the air fuel ratio detected by the downstream air fuel ratio detection unit is small is a case where the air fuel ratio of the exhaust gas changes little before and after the second exhaust gas purification device, and in such a case, it is possible to determine that the second exhaust gas purification device has degraded. Accordingly, in the present invention, in cases where the predetermined air fuel ratio difference derived from the difference between the air fuel ratio estimated by said first air fuel ratio estimation unit and the air fuel ratio detected by said downstream air fuel ratio detection unit is equal to or less than the predetermined threshold, the determination unit makes a determination that the second exhaust gas purification device has degraded.

According to this, it is possible to make a determination as to the degradation of the second exhaust gas purification device in a more reliable manner by using a simpler technique. Here, note that in the present invention, the predetermined air fuel ratio difference may be the difference itself or an absolute value thereof between the air fuel ratio estimated by the first air fuel ratio estimation unit and the air fuel ratio detected by the downstream air fuel ratio detection unit at a specific point in time, or may be a value obtained by applying a certain calculation operation to that difference. In addition, the predetermined threshold is defined as a value with which it can be determined that the second exhaust gas purification device has degraded in cases where said air fuel ratio difference is equal to or less than that threshold, and it may be set beforehand through experiments, etc.

Moreover, in the present invention, said air fuel ratio difference may also be an integrated value that is obtained by integrating the difference between the air fuel ratio estimated by said first air fuel ratio estimation unit and the air fuel ratio detected by said downstream air fuel ratio detection unit over a predetermined period of time.

If doing so, the determination unit makes a determination that the second exhaust gas purification device has degraded in cases where the value obtained by integrating the difference between the air fuel ratio estimated by the first air fuel ratio estimation unit and the air fuel ratio detected by the downstream air fuel ratio detection unit over the predetermined period of time becomes equal to or less than the threshold, as a result of which adverse effects of short-time noise, measurement errors, etc., can be eliminated, and the degradation of the second exhaust gas purification device can be determined from an overall tendency over the predetermined period of time. Thereby, the precision of the above-mentioned determination can be improved.

Further, in the present invention, in cases where a predetermined first air fuel ratio difference derived from a difference between the air fuel ratio estimated by said first air fuel ratio estimation unit and the air fuel ratio detected by said downstream air fuel ratio detection unit is larger than a first threshold, and also where a predetermined second air fuel ratio difference derived from a difference between the air fuel ratio estimated by said second air fuel ratio estimation unit and the air fuel ratio detected by said downstream air fuel ratio detection unit is larger than a predetermined second threshold, said determination unit may make a determination that said first exhaust gas purification device has degraded.

Here, in cases where the difference between the air fuel ratio of the exhaust gas in the exhaust passage between the first exhaust gas purification device and the second exhaust gas purification device estimated by the first air fuel ratio estimation unit, and the air fuel ratio detected in the exhaust passage at the downstream side of the second exhaust gas purification device detected by the downstream air fuel ratio detection unit is sufficiently large, it means that the air fuel ratio greatly changes before and after the second exhaust gas purification device, so it can be determined that the second exhaust gas purification device has not degraded.

Furthermore, in cases where the difference between the estimated air fuel ratio at the downstream side of the second exhaust gas purification device and the air fuel ratio actually detected at the downstream side of the second exhaust gas purification device is sufficiently large, it can be determined that at least either one of the first exhaust gas purification device and the second exhaust gas purification device has degraded.

Accordingly, in the present invention, in cases where the first air fuel ratio difference derived from the difference between the air fuel ratio estimated by the first air fuel ratio estimation unit and the air fuel ratio detected by the downstream air fuel ratio detection unit is larger than the first threshold, and also where the predetermined second air fuel ratio difference derived from the difference between the air fuel ratio estimated by the second air fuel ratio estimation unit and the air fuel ratio detected by the downstream air fuel ratio detection unit is larger than the second threshold, it is determined that the first exhaust gas purification device has degraded.

According to this, it is possible to make a determination as to the degradation of the first exhaust gas purification device in a more reliable manner by using a simpler structure and calculation operation. Here, note that in the present invention, the first air fuel ratio difference may be the difference itself or an absolute value thereof between the air fuel ratio estimated by the first air fuel ratio estimation unit and the air fuel ratio detected by the downstream air fuel ratio detection unit at a specific point in time. Alternatively, the first air fuel ratio difference may be a value obtained by applying a certain calculation operation to the above-mentioned difference, or may be the same as said predetermined air fuel ratio difference. In addition, the first threshold is defined as a value with which it can be determined that the second exhaust gas purification device has not degraded in cases where the first air fuel ratio difference is larger than the first threshold, and it may be set beforehand through experiments, etc., or may be the same as the above-mentioned predetermined threshold.

In addition, in the present invention, the second air fuel ratio difference may be the difference itself or an absolute value thereof between the air fuel ratio estimated by the second air fuel ratio estimation unit and the air fuel ratio detected by the downstream air fuel ratio detection unit at a specific point in time, or may be a value obtained by applying a certain calculation operation to that difference. Also, the second threshold is defined as a value with which it can be determined that at least one of the first exhaust gas purification device and the second exhaust gas purification device has degraded in cases where the second air fuel ratio difference is larger than the second threshold, and it may be set beforehand through experiments, etc.

Moreover, in the present invention, said first air fuel ratio difference may be an integrated value that is obtained by integrating the difference between the air fuel ratio estimated by said first air fuel ratio estimation unit and the air fuel ratio detected by said downstream air fuel ratio detection unit over a predetermined period of time, and said second air fuel ratio difference may also be an integrated value that is obtained by integrating the difference between the air fuel ratio estimated by said second air fuel ratio estimation unit and the air fuel ratio detected by said downstream air fuel ratio detection unit over a predetermined period of time.

If doing so, the determination unit determines the degradation of the first exhaust gas purification device, in cases where the difference between the air fuel ratio estimated by the first air fuel ratio estimation unit and the air fuel ratio detected by the downstream air fuel ratio detection unit is sufficiently large as an overall tendency over the specified period of time, and also where the difference between the air fuel ratio estimated by the second air fuel ratio estimation unit and the air fuel ratio detected by the downstream air fuel ratio detection unit is sufficiently large as an overall tendency over the specified period of time. Accordingly, the influence of short-time noise or measurement errors can be eliminated, whereby the precision in the determination of the degradation of the first exhaust gas purification device can be improved.

In addition, in the present invention, said second exhaust gas purification device may be an exhaust gas purification device without a catalyst precious metal carried thereon, and provision may be further made for:

an oxidation catalyst that is arranged in said exhaust passage at the downstream side of the second exhaust gas purification device; and a temperature detection unit that detects the temperature of said oxidation catalyst;

wherein said determination unit may determine the degradation of said second exhaust gas purification device based on the temperature of said oxidation catalyst.

Here, let us consider the case where no catalyst precious metal is carried or supported on the second exhaust gas purification device. In this case, the second exhaust gas purification device has an oxygen occlusion ability, but is in a state where it does not fully have a catalytic function to cause the $O_2$ released in a rich atmosphere to react with, for example, CO in the exhaust gas thereby to consume the CO. When doing so, the $O_2$ released from the second exhaust gas purification device is put in a state to flow downstream as it is without oxidizing the CO. As a result, the CO concentration of the exhaust gas does not change before and after the second exhaust gas purification device, and the air fuel ratio detected by the downstream air fuel ratio detection unit changes to a leaner side due to the existence of $O_2$, so that there is a possibility that the detection accuracy of the degradation of the second exhaust gas purification device may get worse. Accordingly, in the present invention, the determination of degradation is made by focusing on the temperature detection unit that detects the temperature of the oxidation catalyst.

That is, the oxidation catalyst having an oxidation ability and the temperature detection unit for detecting the temperature of this oxidation catalyst are arranged at the downstream side of the second exhaust gas purification device which has an oxidization occlusion ability but does not have a catalyst precious metal. Then, the $O_2$ discharged from the second exhaust gas purification device and CO are caused to react with each other in the oxidation catalyst, so that the CO is consumed. At that time, the amount of heat generated due to the heat of reaction of $O_2$, CO, etc., in the oxidation catalyst is detected by means of an exhaust gas temperature detection unit, and the degradation of the second exhaust gas purification device is determined based on the amount of generated heat thus detected.

More specifically, in cases where the second exhaust gas purification device is normal with no degradation of its oxygen occlusion ability, $O_2$ is released from the second exhaust gas purification device by the passage of CO, and these $O_2$ and CO react with each other in the oxidation catalyst, so the above-mentioned amount of generated heat becomes large. On the other hand, in cases where the oxygen occlusion ability of the second exhaust gas purification device has degraded, the amount of $O_2$ released from the second exhaust gas purification device by the passage of CO decreases, so the amount of heat generated by the reaction of $O_2$ and CO in the oxidation catalyst also decreases. Accordingly, it is possible to determine the degradation of the second exhaust gas purification device by detecting the temperature of the oxidation catalyst.

Thus, according to the present invention, it becomes possible to perform, with more accuracy, the determination of the degradation of the second exhaust gas purification device which has an oxygen occlusion ability but has not a catalyst precious metal carried thereon.

In addition, in the present invention, the first exhaust gas purification device may be a NOx occlusion reduction type catalyst, and the second exhaust gas purification device may also be a filter having an oxidization occlusion ability.

Here, note that the units for solving the problems in the present invention can be used in combination as much as possible.

Effect of the Invention

In the present invention, in an exhaust gas purification system provided with two or more exhaust gas purification devices each having an oxygen occlusion ability arranged in series in an exhaust passage, the degradation of each of the exhaust gas purification devices can be detected in a distinguished manner with a simple construction.

BEST MODES FOR CARRYING OUT THE INVENTION

Hereinafter, best modes carrying out the present invention will be described in detail by way of example with reference to the attached drawings.

[First Embodiment]

Figure 1:
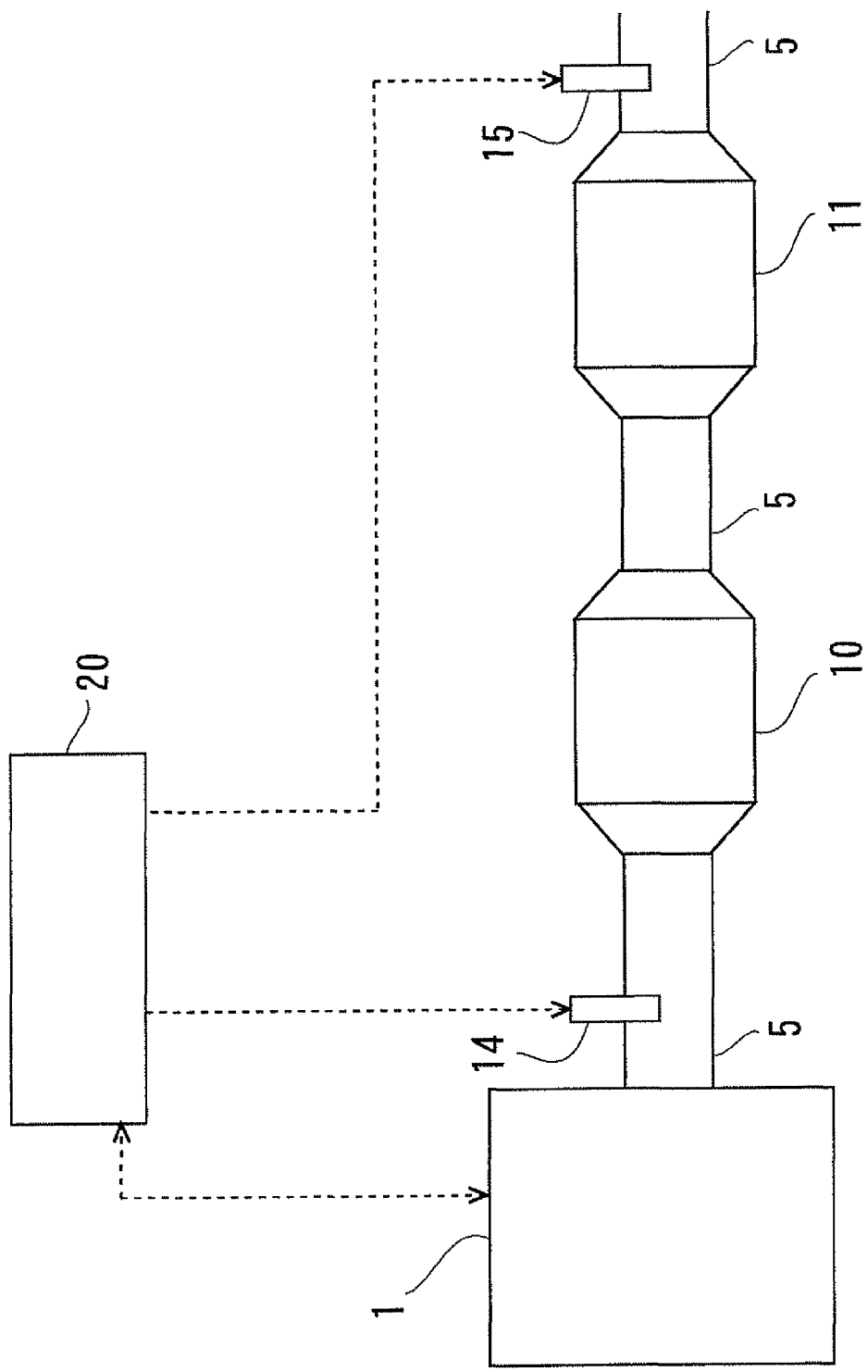
FIG. 1 is a view showing the schematic construction of an internal combustion engine and its exhaust system and control system according to a first embodiment of the present invention.

FIG. 1 is a view showing the schematic construction of an internal combustion engine and its exhaust system and control system according to a first embodiment of the present invention. Here, note that in FIG. 1, the interior of an internal combustion engine 1 and its intake system are omitted. An exhaust pipe 5 acting as an exhaust passage in which an exhaust gas discharged from the internal combustion engine 1 flows is connected to the internal combustion engine 1, and this exhaust pipe 5 is also connected at its downstream side to a muffler which is not illustrated. Also, in the middle of the exhaust steam pipe 5, there is arranged an occlusion reduction type NOx catalyst (hereinafter abbreviated as an "NSR") 10 that serves to purify the NOx in the exhaust gas. In addition, a filter 11 for collecting particulate matters in the exhaust gas is arranged in the exhaust pipe 5 at the downstream side of the NSR 10.

Cerium (Ce) oxide (hereinafter also referred to as ceria), an alkaline earth metal, etc., are carried or supported by this filter 11 so as to purify hydrocarbon (HC), carbon monoxide (CO), etc., in the exhaust gas. With the cerium oxide, etc., carried on the filter 11, the filter 11 is added by an oxygen occlusion ability (hereinafter also referred to as an Oxygen Storage Component (OSC) function) in which oxygen is stored in the filter 11 in particular under an oxidizing atmosphere in which the air fuel ratio of the exhaust gas is lean, and released therefrom under a reducing atmosphere in which the air fuel ratio of the exhaust gas is rich. In addition, catalyst precious metals such as platinum (Pt), rhodium (Rh), etc., are carried or supported by the filter 11, so that the $O_2$ released based on the OSC function under a rich reducing atmosphere reacts with CO, HC, etc., thus making it easy for CO and HC to be consumed.

Here, note that an upstream AF sensor 14 for detecting the air fuel ratio of the exhaust gas passing through the exhaust pipe 5 at the upstream side of the NSR 10 is arranged in the exhaust pipe 5 at the upstream side of the NSR 10. In addition, a downstream AF sensor 15 for detecting the air fuel ratio of the exhaust gas passing through the exhaust pipe 5 at the downstream side of the filter 11 is arranged in the exhaust pipe 5 at the downstream side of the filter 11. These upstream AF sensor 14 and downstream AF sensor 15 actually measure the individual CO concentrations in the exhaust gas, and detect the individual air fuel ratios based on the values of the CO concentrations thus measured, respectively.

An electronic control unit (ECU) 20 for controlling the internal combustion engine 1 and the exhaust system is arranged in combination with the internal combustion engine 1 and its exhaust system constructed as stated above. This ECU 20 is a unit that controls the operating state of the internal combustion engine 1, etc., in accordance with an operating condition of the internal combustion engine 1 and/or a driver's request, and also performs control on an exhaust gas purification system including the NSR 10 and the filter 11 of the internal combustion engine 1.

Sensors associated with the control of the operating state of the internal combustion engine 1, such as an air flow meter, a crank position sensor, an accelerator position sensor, which are not illustrated, are connected to the ECU 20 through electric wiring, and output signals from these sensors are inputted to the ECU 20. In addition, the upstream AF sensor 14 and the downstream AF sensor 15 are also connected to the ECU 20 through electric wiring, so that the detected values of the air fuel ratios of the exhaust gas at the upstream side of the NSR 10 and at the downstream side of the filter 11 are inputted to the ECU 20.

In addition, the ECU 20 is equipped with a CPU, a ROM, a RAM and so on, and programs for performing a variety of controls on the internal combustion engine 1 and maps storing data are stored in the ROM.

In cases where a NOx reduction treatment for the NSR 10 is performed in the above-mentioned construction, enrich control is carried out in which the air fuel ratio of the exhaust gas is made rich, for example, by performing auxiliary injection control in the internal combustion engine 1. Here, reference will be made to the change of the air fuel ratio in each part of the exhaust system at the time of enrich control in cases where the functions of both the NSR 10 and the filter 11 are normal.

Figure 2:
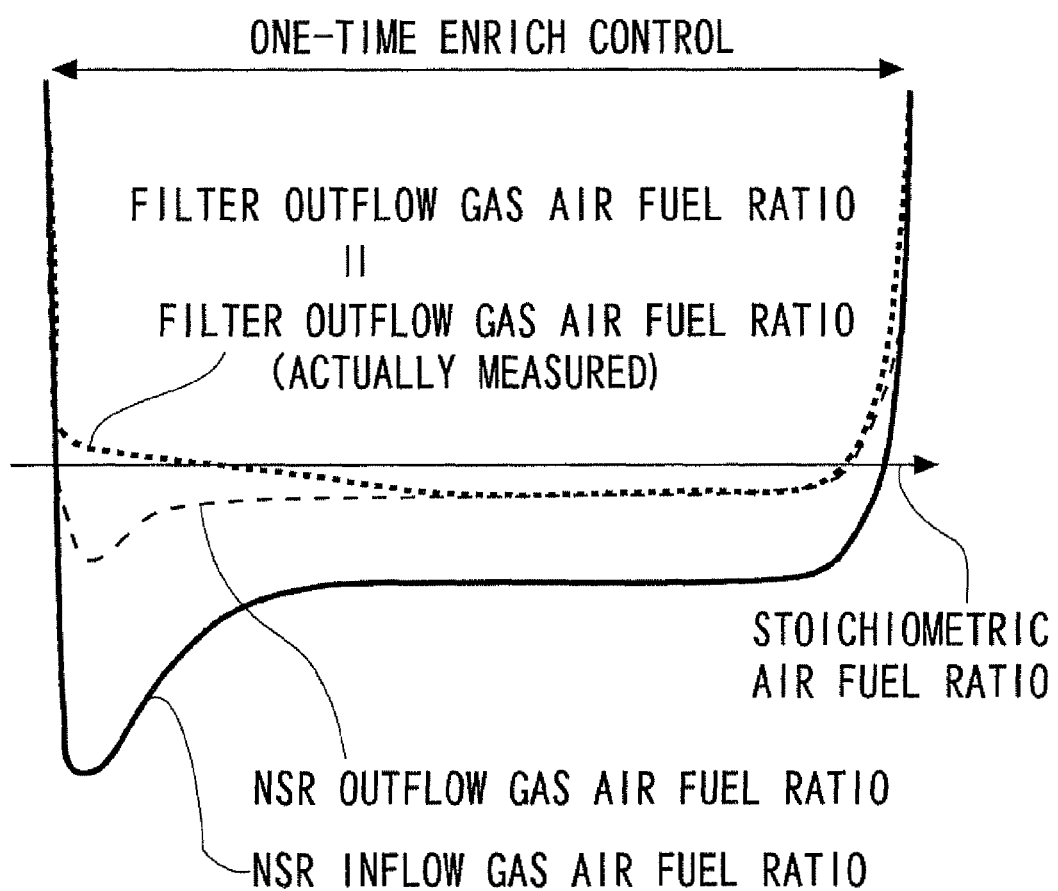
FIG. 2 is a graph showing the changes of an NSR inflow gas air fuel ratio, an NSR outflow gas air fuel ratio, and a filter outflow gas air fuel ratio in cases where the enrich control of an exhaust gas is carried out in a state where both an NSR and a filter are normal.

FIG. 2 shows the changes of the air fuel ratios of an NSR inflow gas flowing into the NSR 10, an NSR outflow gas discharged from the NSR 10, and a filter outflow gas discharged from the filter 11, all in one enrich control operation (rich event). A solid thick line indicates the air fuel ratio of the NSR inflow gas. This air fuel ratio is measured by the upstream AF sensor 14. In addition, a curve indicated by a middle broken line is the air fuel ratio of the NSR outflow gas. In cases where the NSR 10 is normal, this air fuel ratio of the NSR outflow gas changes to a lean side because the CO in the exhaust gas is oxidized by the NOx released from the NSR 10 in a rich atmosphere to lower the concentration of CO. Here, note that this air fuel ratio of the NSR outflow gas is basically equivalent to the air fuel ratio of the filter inflow gas which flows into the filter 11.

Then, a thick dotted line indicates the air fuel ratio of the filter outflow gas. In cases where the filter 11 is normal, this air fuel ratio of the filter outflow gas changes to a further leaner side than the air fuel ratio of the filter inflow gas, because the $O_2$ occluded in the filter 11 is released in a rich atmosphere due to the OSC function of the filter 11 thereby to oxidize and consume CO.

Subsequently, reference will be made to the change of the air fuel ratio of the exhaust gas in each place in cases where the NOx occlusion reduction function of the NSR 10 and/or the oxygen occlusion ability of the filter 11 have degraded. FIG. 3A shows the change of the air fuel ratio in cases where only the NOx occlusion reduction function of the NSR 10 has degraded. In this case, the CO in the exhaust gas becomes less liable to be oxidized in the NSR under a rich atmosphere, so the air fuel ratio of the NSR outflow gas becomes equivalent to the air fuel ratio of the NSR inflow gas. Then, CO is oxidized by the OSC function of the filter 11, so the air fuel ratio of the filter outflow gas changes to a leaner side than the air fuel ratio of the NSR outflow gas.

Figure 3B:
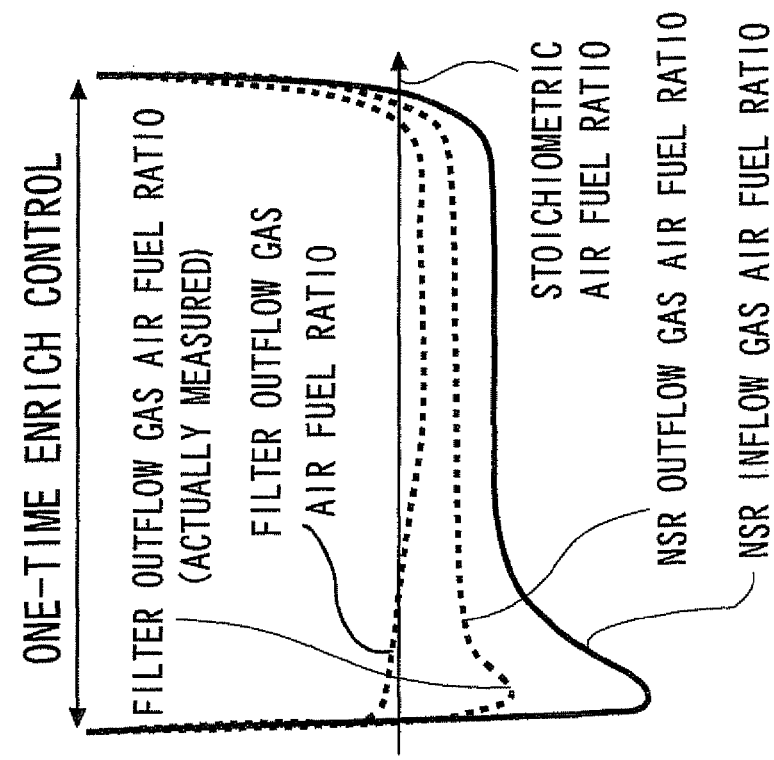
FIG. 3B is a graph showing the changes of the NSR inflow gas air fuel ratio, the NSR outflow gas air fuel ratio, and the filter outflow gas air fuel ratio in cases where the enrich control of an exhaust gas is carried out in a state where the filter has degraded.
Figure 3A:
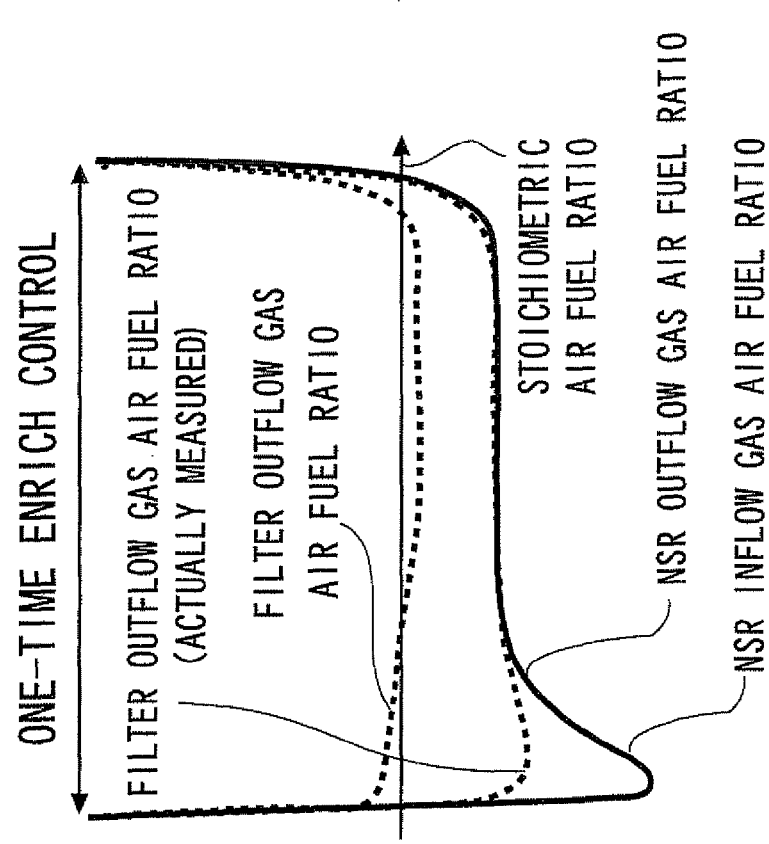
FIG. 3A is a graph showing the changes of the NSR inflow gas air fuel ratio, the NSR outflow gas air fuel ratio, and the filter outflow gas air fuel ratio in cases where the enrich control of an exhaust gas is carried out in a state where the NSR has degraded.

Then, FIG. 3B shows the change of the air fuel ratio in each place in cases where only the OSC function of the filter 11 has degraded. In this case, the CO in the exhaust gas is consumed by the NOx occlusion reduction function of the NSR 10, so the air fuel ratio of the NSR outflow gas changes to a leaner side as compared with the air fuel ratio of the NSR inflow gas. On the other hand, the amount of $O_2$ released from the filter 11 under a rich atmosphere decreases, so the amount of CO consumed in the filter 11 decreases, and hence the air fuel ratio of the NSR outflow gas (filter inflow gas) and the air fuel ratio of the filter outflow gas become equivalent to each other.

As described above, it is understood that in the exhaust system of the internal combustion engine 1, the respective relations among the NSR inflow gas, the NSR outflow gas (filter inflow gas) and the filter outflow gas differ depending on the case where the NOx occlusion reduction function of the NSR 10 has degraded, and the case where the OSC function in the filter 11 has degraded. In this embodiment, by making use of this characteristic, the degradation of the NSR 10 and the degradation of the filter 11 are determined in a distinguished manner in the exhaust gas purification system which is equipped with the NSR 10 and the filter 11 having an OSC function at the upstream side and at the downstream side, respectively, of the exhaust system.

That is, in this embodiment, the air fuel ratio of the NSR outflow gas is estimated from the air fuel ratio at the upstream side of the NSR 10 detected by the upstream AF sensor 14 and from the NOx occlusion reduction ability in the NSR 10 at the time of normal operation. Also, the air fuel ratio of the filter outflow gas is estimated from the air fuel ratio of the NSR outflow gas thus estimated and the OSC function of the filter 11 at the time of normal operation. Then, in cases where the air fuel ratio of the filter outflow gas detected by the downstream AF sensor 15 is different from the above-mentioned estimated air fuel ratio of the filter outflow gas to more than a certain extent and also from the estimated air fuel ratio of the NSR outflow gas to more than a certain extent, it is determined that the NOx occlusion reduction ability of the NSR 10 has degraded. In addition, in cases where the air fuel ratio of the filter outflow gas detected by the downstream AF sensor 15 matches the estimated air fuel ratio of the NSR outflow gas to more than a certain extent, it is determined that the filter 11 has degraded.

Figure 4:
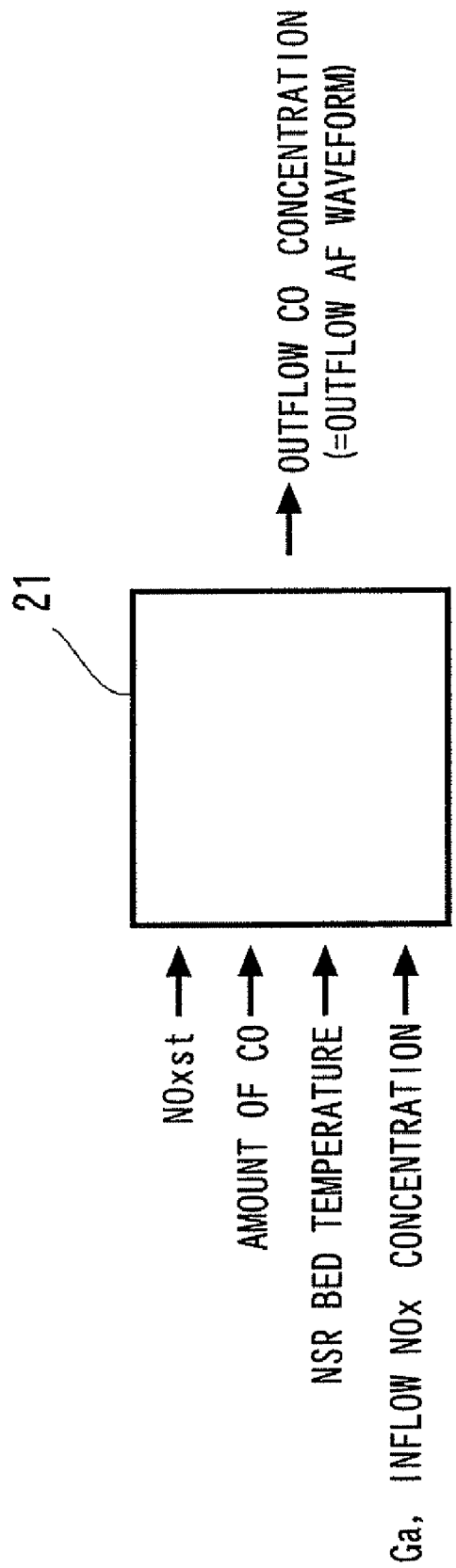
FIG. 4 is a view for explaining a reduction amount calculation part according to the first embodiment of the present invention and the information inputted and outputted to the reduction amount calculation part.

Next, more detailed reference will be made to the process of the degradation determination of the NSR 10 and the filter 11 in this embodiment. FIG. 4 shows a reduction amount calculation part 21 in this embodiment, the information supplied to the reduction amount calculation part 21 and the information calculated by the reduction amount calculation part 21. In FIG. 4, the reduction amount calculation part 21 is composed of the ECU 20.

Among the information inputted to the reduction amount calculation part 21, NOxst is the amount of NOx accumulated in the NSR 10 at the time of estimation, and is the amount stored in an occlusion map created in relation to the history of the engine operating state after the last NOx reduction treatment. In addition, the amount of CO is the amount of the CO in the exhaust gas flowing into the NSR 10, and is estimated from the output of the upstream AF sensor 14.

In addition, the bed temperature of the NSR may be acquired by being read from a map created in relation to the history of the operating state of the internal combustion engine 1, or may be detected by an exhaust temperature sensor (unillustrated) inside the NSR 10. Also, the concentration of inflow NOx may be acquired from the amount of NOx read out from a map created in relation to the output value of an unillustrated air flow meter and the engine operating state.

Then, the amount of NOx reduction is calculated based on the following expression.

$$d[NOxst]/dt = -k_0 [CO]^2 [NOxst] e^{(-E/RT)} \quad (1)$$

In expression (1), $d[NOxst]/dt$ corresponds to the amount of NOx reduction. Here, $k_0$ is an experimentally optimized constant of proportionality; E is activation energy; R is a gas constant; and T is the NSR bed temperature.

Further, it becomes possible to calculate the amount of CO consumed by the reducing of $NO_2$ based on a chemical reaction of $2CO + NO_2 \rightarrow N_2 + CO_2$, thereby making it possible to estimate the concentration of CO. Thus, in the ECU 20, the waveform of the air fuel ratio in the NSR outflow gas is always prepared.

Figure 5:
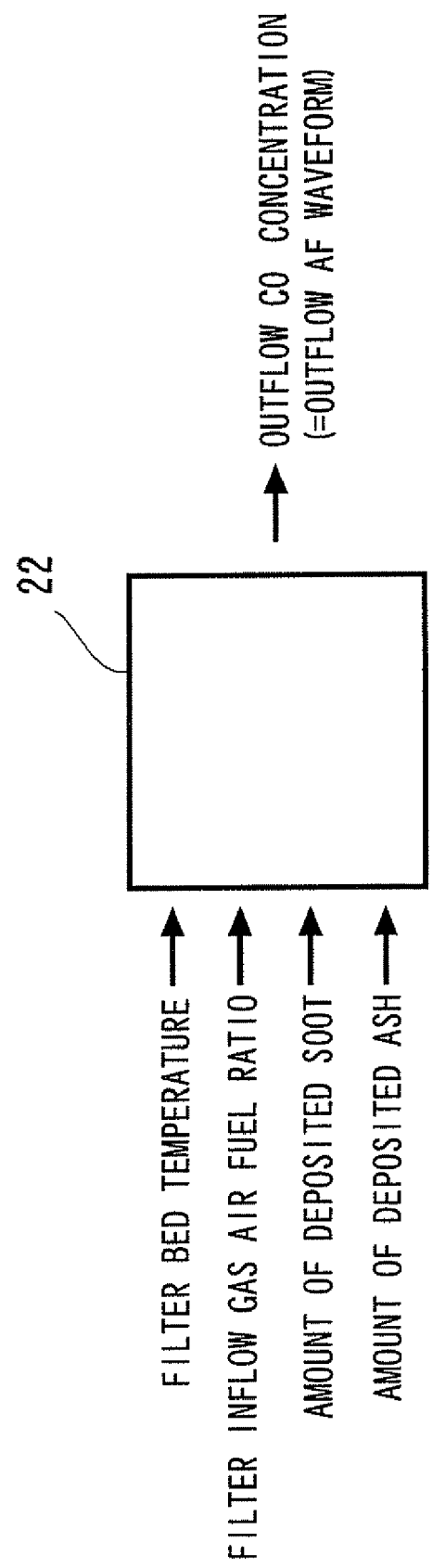
FIG. 5 is a view for explaining an OSC calculation part according to the first embodiment of the present invention and the information inputted and outputted to the OSC calculation part.
Figure 6:
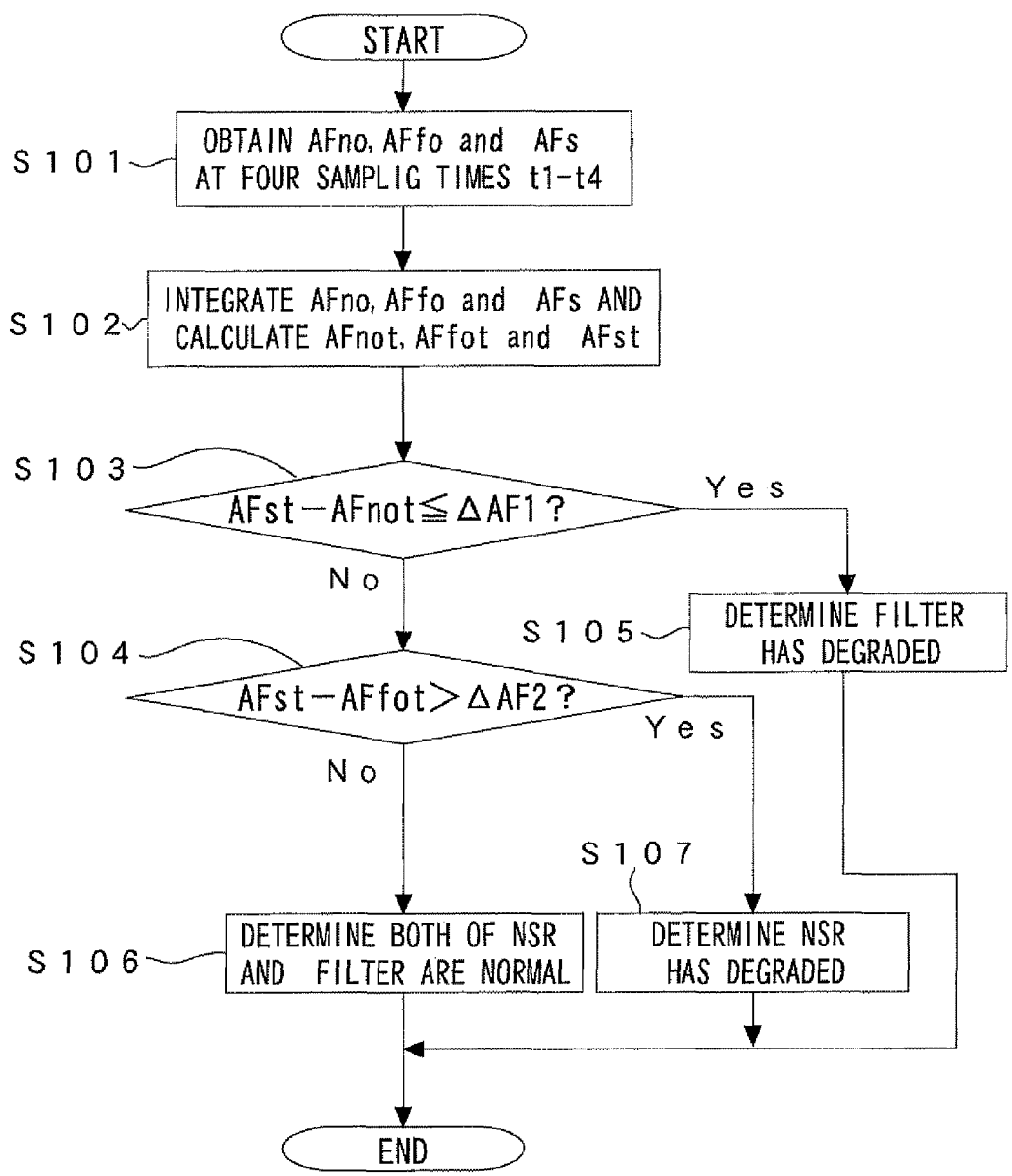
FIG. 6 is a flow chart showing the content of a degradation determination routine according to the first embodiment of the present invention.

Next, FIG. 5 shows an OSC calculation part 22 in this embodiment, the information supplied to the OSC calculation part 22 and the information calculated by the OSC calculation part 22. In FIG. 6, the OSC calculation part 22 is composed of the ECU 20.

Among the information inputted to the OSC calculation part 22, the bed temperature of a diesel particulate filter (DPF) may be acquired by being read from a map created in relation to the history of the operating state of the internal combustion engine 1, or a sensor may be arranged for detecting the DPF bed temperature. In addition, it is possible to derive the inflow AF of the DPF from the concentration of the outflow CO calculated by the reduction amount calculation part 21 as mentioned above. Moreover, the amount of deposited soot and the amount of deposited ash are the amount of soot and the amount of ash, respectively, deposited on the filter 11 at the time of estimation, and are the individual amounts stored in deposition maps created in relation to the history of the engine operating state after the last PM regeneration processing.

Then, the concentration of outflow CO is estimated by reading the value of the outflow CO concentration corresponding to the above-mentioned inputted information from a map in which the relation among the DPF bed temperature, the DPF inflow AF, the amount of deposited soot, the amount of deposited ash, and the outflow CO concentration is stored. Here, note that the relation among the DPF bed temperature, the DPF inflow AF, the amount of deposited soot, the amount of deposited ash, and the outflow CO concentration is derived based on the oxygen occlusion ability of the filter 11, experimentally or theoretically with the same concept as expression (1).

That is, in this embodiment, the air fuel ratio of the NSR outflow gas is estimated by the reduction amount calculation part 21 based on the air fuel ratio detected by the upstream AF sensor 14 and the NOx occlusion reduction ability of the NSR 10. Then, the air fuel ratio of the filter outflow gas is estimated based on the estimated air fuel ratio of the NSR outflow gas and the oxygen occlusion ability of the filter 11.

Subsequently, based on the estimated NSR outflow gas air fuel ratio, the estimated filter outflow gas air fuel ratio, and the air fuel ratio detected by the downstream AF sensor, the determination of the degradation of the NSR 10 and the filter 11 is performed as follows. Here, note that FIG. 6 shows a flow chart of a degradation determination routine used for the determination of the degradation of the NSR 10 and the filter 11.

Figure 7:
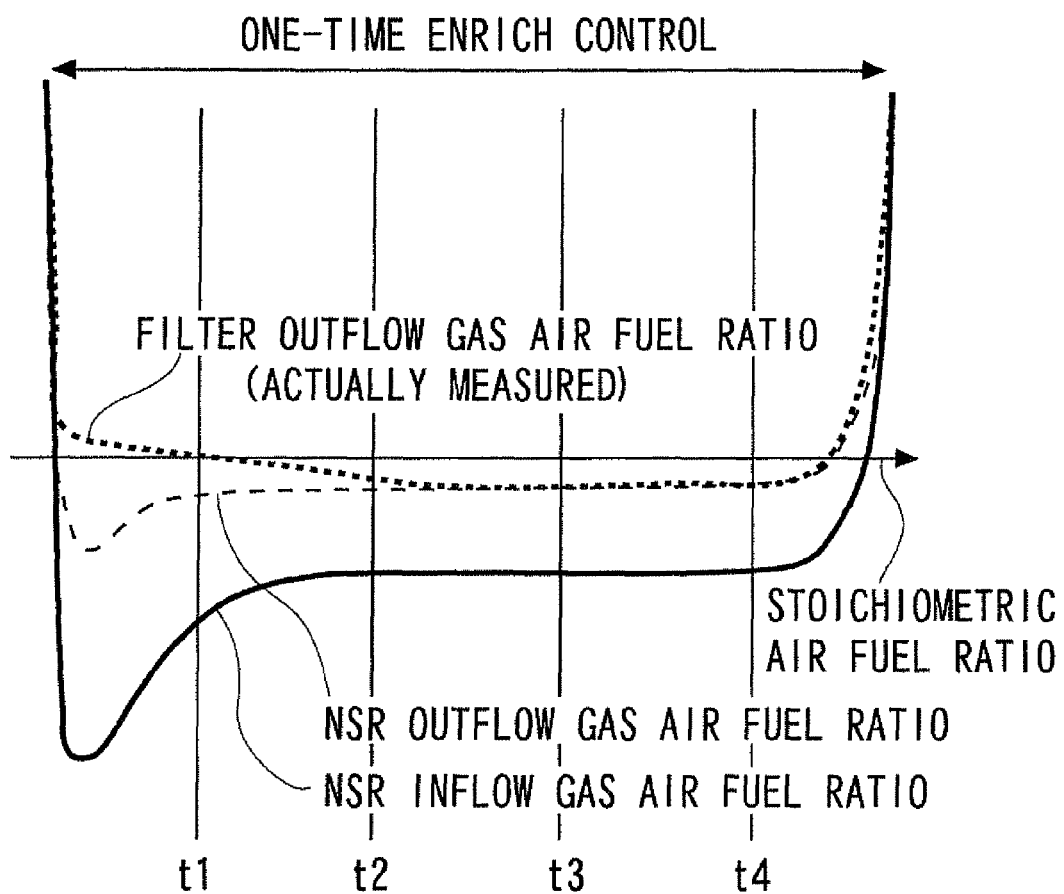
FIG. 7 is a view for explaining timings at which the differences of the NSR inflow gas air fuel ratio, the NSR outflow gas air fuel ratio and the filter outflow gas air fuel ratio are detected and integrated.

In this embodiment, an NSR outflow gas air fuel ratio AFno estimated using the reduction amount calculation part 21, a filter outflow gas air fuel ratio AFfo estimated using the OSC calculation part 22, and a detected filter outflow gas air fuel ratio AFs detected by the downstream AF sensor 15 are acquired four times during one-time enrich control (rich event) (degradation determination routine S101). Here, note that an example of sampling times t1-t2 in one-time enrich control is shown in FIG. 7.

Then, the individual values of NSR outflow gas air fuel ratios AFno1-AFno4, filter outflow gas air fuel ratios AFfo1-AFfo4, and detected filter outflow gas air fuel ratios AFs1-AFs4, which have been obtained in four sampling times, are integrated, respectively, and an integrated NSR outflow gas air fuel ratio AFnot, an integrated filter outflow gas air fuel ratio AFfot, and an integrated detected filter outflow gas air fuel ratio AFst are calculated (degradation determination routine S101).

In cases where the difference between AFst and AFnot is equal to or less than a first reference air fuel ratio difference Δ AF1 ("Yes" in the degradation determination routine S103), it can be determined that the air fuel ratio is in a state shown in FIG. 3B, so a determination is made that the oxygen occlusion ability of the filter 11 has degraded (degradation determination routine S105).

Also, in cases where the difference between AFst and AFfot is larger than the first reference air fuel ratio difference Δ AF1 ("No" in the degradation determination routine S103), and also where the difference between AFst and AFnot is larger than a second reference air fuel ratio difference Δ AF2 ("Yes" in a degradation determination routine S104), it can be determined that the air fuel ratio is in a state shown in FIG. 3A, so a determination is made that the NSR 10 has degraded.

In addition, in cases where the difference between AFst and AFfot is larger than the first reference air fuel ratio difference Δ AF1 ("No" in the degradation determination routine S103), and also where the difference between AFst and AFnot is equal to or less than the second reference air fuel ratio difference Δ AF2 ("No" in the degradation determination routine S104), it can be determined that the air fuel ratio is in a state shown in FIG. 2, so a determination is made that the NSR 10 and the filter 11 are both normal.

As explained above, according to this embodiment, it becomes possible to determine the degradation of the NSR 10 and the degradation of the filter 11 in a distinguished manner with a simple construction and calculation operation by using the downstream AF sensor 15 which has conventionally been provided for the control of the exhaust air fuel ratio.

Although in the above-mentioned embodiment, the air fuel ratio of the exhaust gas at the upstream side of the NSR 10 is detected by the upstream AF sensor 14, the value of the air fuel ratio of the exhaust gas at the upstream side of the NSR 10 may also be estimated from the operating state of the internal combustion engine 1.

Here, note that in the above-mentioned embodiment, the NSR 10 corresponds to a first exhaust gas purification device. The filter 11 corresponds to a second exhaust gas purification device. The upstream AF sensor 14 corresponds to an upstream air fuel ratio acquisition unit. The downstream AF sensor 15 corresponds to a downstream air fuel ratio detection unit. In addition, a first air fuel ratio estimation unit is constructed to include the reduction amount calculation part 21. A second air fuel ratio estimation unit is constructed to include the OSC calculation part 22. A determination unit is constructed to include the ECU 20 that executes the degradation determination routine.

In addition, in the degradation determination routine, the difference between AFst and AFnot is an example of a predetermined air fuel ratio difference and the predetermined first air fuel ratio difference. Moreover, the first reference air fuel ratio difference Δ AF1 is an example of a predetermined threshold and the first threshold. Further, the difference between AFst and AFfot is an example of a predetermined second air fuel ratio difference. Furthermore, the second reference air fuel ratio difference Δ AF2 is an example of a predetermined second threshold.

[Second Embodiment]

Next, a second embodiment of the present invention will be described. In the second embodiment, reference will be made to the case in which a filter has an OSC function with ceria, an alkaline earth metal or the like being carried thereon, but with no catalyst precious metal such as Pt being carried thereon.

In this case, in a state where the air fuel ratio of an exhaust gas is rich, $O_2$ in the filter is released based on the OSC function in the filter. However, because no catalyst precious metal is carried on the filter, the $O_2$ released is hard to react with the CO in the exhaust gas, so that the concentration of the CO before and after the filter does not change so much. In addition, the $O_2$ released based on the OSC function moves downstream as it is, so there is a possibility that the air fuel ratio detected by the downstream AF sensor may shift to a lean side. For such a reason, in cases where the filter has only an OSC function with no catalyst precious metal being carried thereon, there will be a possibility that the accuracy of the determination of degradation of an NSR and the filter may be lowered. In contrast to this, in this embodiment, an oxidation catalyst (hereinafter also referred to as a CCo) and a temperature sensor for detecting the temperature of the CCo are arranged in an exhaust pipe at the downstream side of the filter, so that the degradation of the filter is determined based on the heat of reaction of $O_2$ and CO in the CCo.

Figure 8:
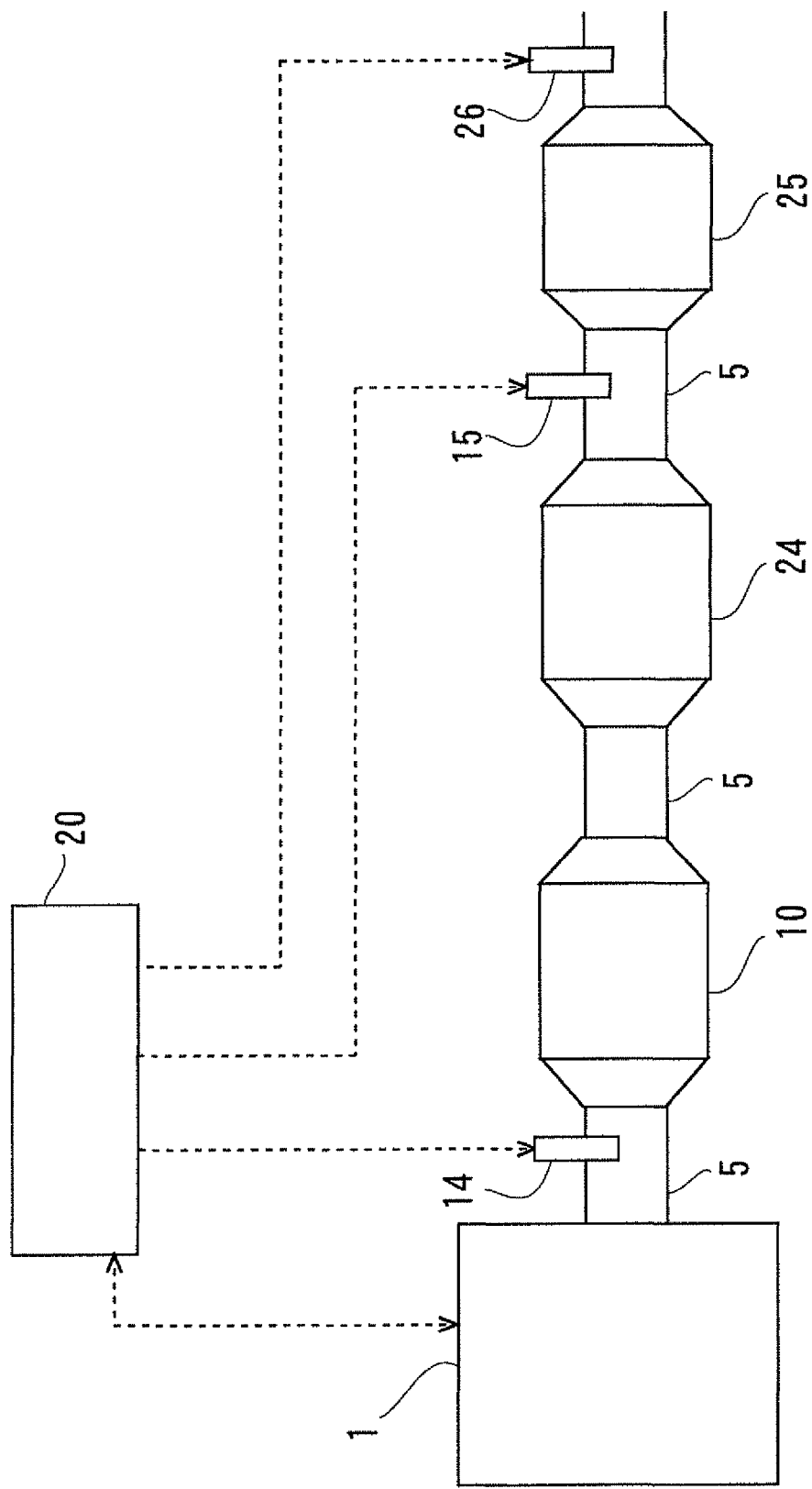
FIG. 8 is a view showing the schematic construction of an internal combustion engine and its exhaust system and control system according to a second embodiment of the present invention.

FIG. 8 is a view showing the schematic construction of an internal combustion engine and its exhaust system and control system according to this second embodiment. The points of difference between this embodiment and the first embodiment are that a filter 24 has an OSC function but with no catalyst precious metal being carried thereon, as mentioned above, and a CCo 25 is arranged at the downstream side of the filter 24, and a temperature sensor 26 for detecting the temperature of the CCo 25 is arranged at the further downstream side of the filter 24. Here, note that the temperature sensor 26 is a sensor which detects the temperature of the exhaust gas discharged from the CCo 25, and in this embodiment, it is assumed that the temperature of the exhaust gas discharged from the CCo 25 at a location immediately downstream thereof is equivalent to the temperature of the CCo 25.

Figure 9A:
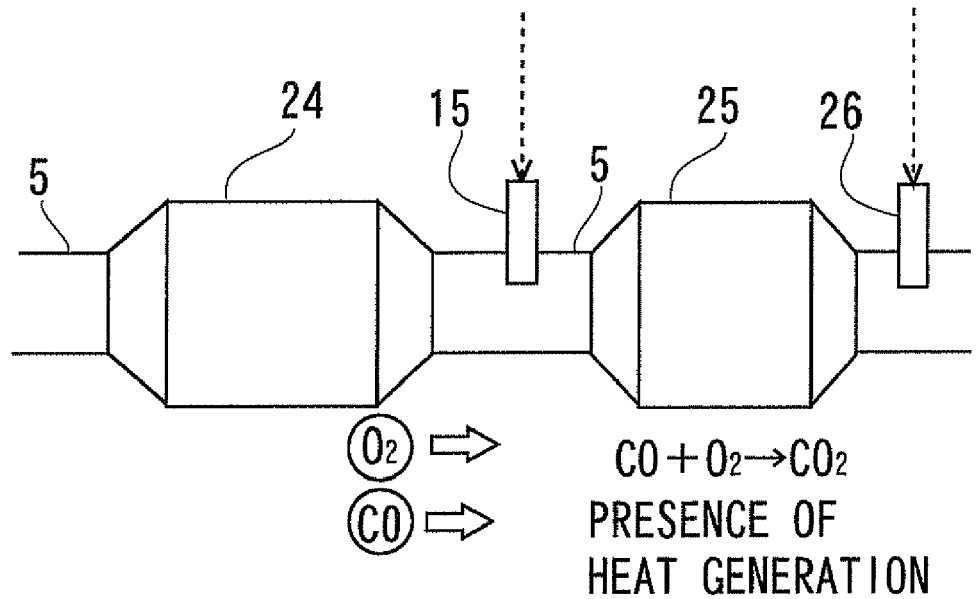
FIG. 9A is a view showing the states of the exhaust system at the time of performing enrich control when a filter is in a normal state, in the second embodiment of the present invention.
Figure 9B:
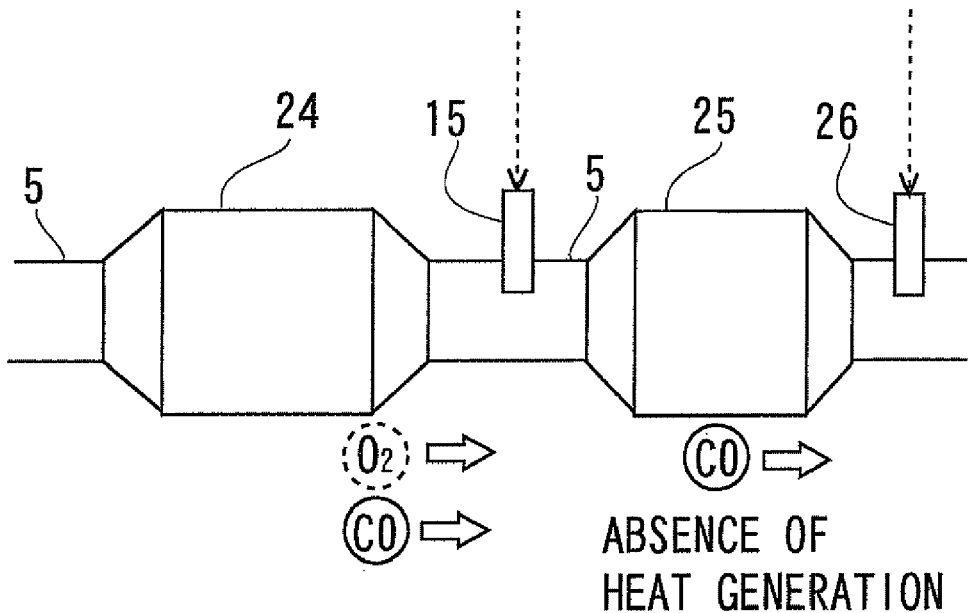
FIG. 9B is a view showing the states of the exhaust system at the time of performing enrich control when a filter is in a degraded state, in the second embodiment of the present invention.

FIG. 9A and FIG. 9B is a view showing the states of the exhaust system when the air fuel ratio of the exhaust gas becomes rich in the case of the OSC function in the filter 24 being normal and in the case of the OSC function in the filter 24 has degraded, respectively. FIG. 9A shows the case in which the OSC function of the filter 24 is normal, and FIG. 9B shows the case in which the OSC function of the filter 24 has degraded. As can be seen from FIG. 9A, in cases where the OSC function of the filter 24 is normal, $O_2$ is released based on the OSC function of the filter 24 in a rich atmosphere. However, because the filter 24 does not have a catalyst precious metal, $O_2$ and CO are hard to react with each other, and hence CO is hard to be consumed. Then, in the CCo 25 at a downstream side of the exhaust pipe 5, CO and $O_2$ react with each other to generate heat.

On the other hand, as can be seen from FIG. 9 B, in cases where the OSC function of the filter 24 has degraded, the concentration of CO does not change so much, but the amount of $O_2$ released based on the OSC function is small, so the amount of heat generated in the CCo 25 decreases. In this embodiment, a temperature rise due to the generation of heat in the CCo 25 is detected by the use of the temperature sensor 26, and in cases where the rise of the detected temperature during enrich control becomes equal to or more than a reference rise temperature Δ Ts, it is determined that the OSC function of the filter 24 is normal, whereas in cases where the rise of the detected temperature is less than the reference rise temperature Δ Ts, it is determined that the OSC function of the filter 24 has degraded. Here, the reference rise temperature Δ Ts is a temperature rise as a threshold with which a determination can be made that the OSC function of the filter 24 is normal, in cases where the temperature rise of the CCo 25 detected by the temperature sensor 26 during enrich control is equal to or more than this, and may be set beforehand through experiments, etc.

According to this, the degradation of the OSC function of the filter 24 with no catalyst precious metal being carried thereon can be determined by a simple method of detecting the temperature rise of the CCo 25 arranged at the downstream side of the filter 24. Here, note that in this embodiment, the amount of $O_2$ released from the filter 24 may be derived from the value of the temperature rise obtained by the above-mentioned method, and the value of the air fuel ratio detected by the downstream AF sensor 15 may be amended based on this thus derived. According to this, the decrease of the detection accuracy of the downstream AF sensor 15 can be amended, and it becomes possible to also determine the degradation of the NOx occlusion reduction ability in the NSR 10 with a high degree of accuracy by means of the method shown in the first embodiment.

Here, note that in the present invention, as long as the concept of deriving a physical quantity equivalent to the amount of heat generated in the CCo 25, and determining the degradation of the filter 24 based on the amount of heat thus generated in the CCo 25 is met, calculations different from those in this embodiment may of course be carried out.

[Third Embodiment]

Next, a third embodiment of the present invention will be described. In this third embodiment, reference will be made to the case in which in the exhaust gas purification system described in the second embodiment, the timing is optimized at which the generation of heat of the CCo 25 is detected.

Figure 10A:
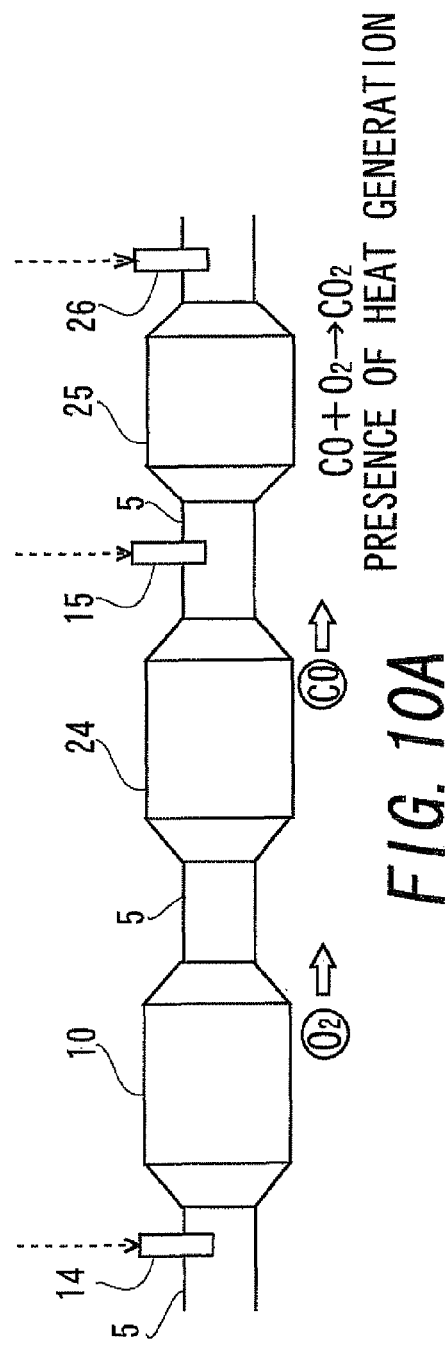
FIG. 10A is a view showing the states of an exhaust system in a third embodiment of the present invention, in the case where temperature detection was carried out immediately after the start of enrich control.

Let us consider a situation immediately after the air fuel ratio of an exhaust gas has been changed from lean to rich in enrich control. In this case, for example, $O_2$ in a lean state remains in an exhaust gas, and the residual $O_2$ may continue to flow to the downstream side of the NSR 10 even after the exhaust gas has been changed to rich. When doing so, as shown in FIG. 10A, in the exhaust gas purification system described in the second embodiment, $O_2$ based on the OSC function may not be released from the filter 24 because of a large amount of residual $O_2$ irrespective of the presence or absence of the degradation of the OSC function in the filter 24. In addition, in the CCo 25, the residual $O_2$ and the CO in the exhaust gas may react with each other irrespective of the presence or absence of the degradation of the OSC function in the filter 24, so the generation of heat occurs therein and the temperature rise detected by the temperature sensor 26 increases. As a result, in this state, the precision in the determination of degradation of the NSR 10 and the filter 11 will be decreased.

Figure 10B:
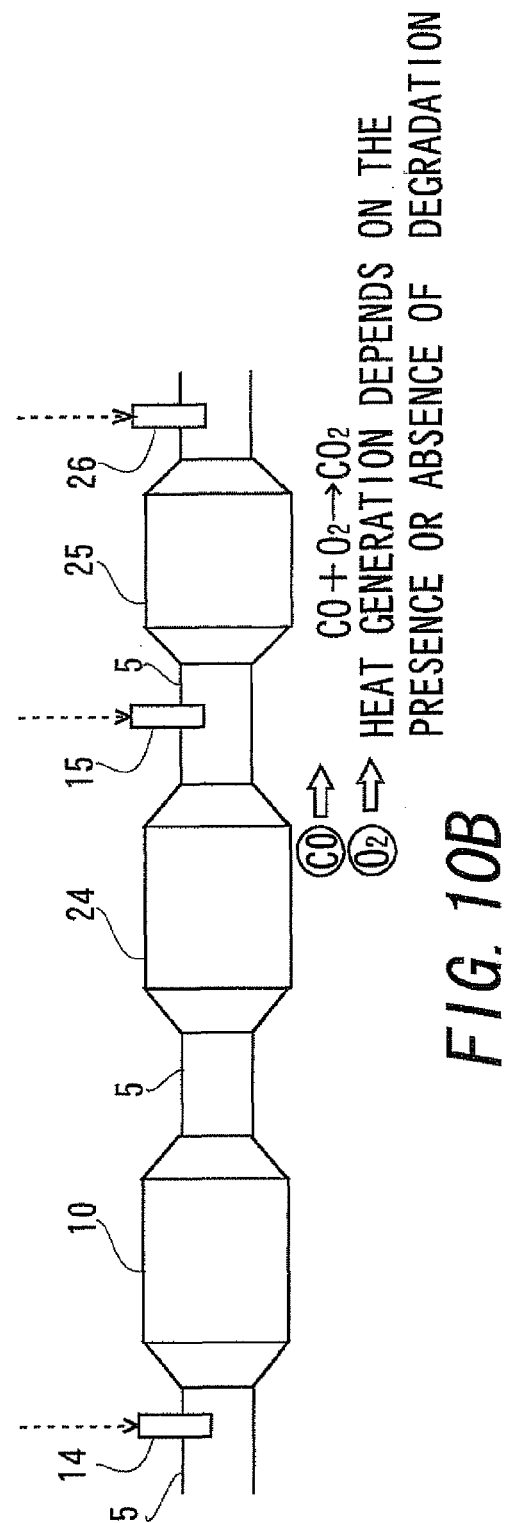
FIG. 10B is a view showing the states of an exhaust system in a third embodiment of the present invention, in the case where temperature detection was carried out after an air fuel ratio became equal to or less than a stoichiometric air fuel ratio.

In contrast to this, in this embodiment, the generation of heat in the CCo 25 is detected after the air fuel ratio detected by the downstream AF sensor 15 has become equal to or less than the stoichiometric air fuel ratio after the start of enrich control. According to this, it becomes possible to detect the generation of heat in the CCo 25 at the time when the residual $O_2$ from the lean state before the switching disappears after the air fuel ratio of the exhaust gas has been switched from lean to rich in the enrich control, as shown in FIG. 10B. Therefore, the influence of the residual $O_2$ on the determination of degradation of the filter 24 can be decreased, thereby making it possible to improve the accuracy of degradation detection.

Here, note that in the above-mentioned embodiments, the NOx reduction treatment to the NSR 10 has been mentioned and explained as an example of enrich control, but the present invention may be applied to enrich control in the SOx poisoning recovery processing of the NSR 10. Also, in the present invention, as a unit for enriching an exhaust gas, there can be used, other than a unit that performs auxiliary injection in the internal combustion engine 1, a fuel addition valve acting as a fuel supply unit arranged in the exhaust pipe 5 at the further upstream side of the upstream AF sensor 14.

In addition, in the above-mentioned embodiments, reference has been made to the example which is provided with two exhaust gas purification devices, i.e., the NSR 10 at the upstream side and the filter 11 at the downstream side, in the exhaust gas purification system, but the present invention may also be applied to an exhaust gas purification system in which the arrangement and/or combination of the exhaust gas purification devices are changed, as long as not deviating from the concept of the present invention. For example, the upstream and downstream arrangement of the NSR 10 and the filter 11 may be replaced with the downstream and upstream arrangement thereof, and a DPNR in which an occlusion reduction type NOx catalyst is carried or supported on a filter may be used.

[EXPLANATION OF REFERENCE NUMERALS AND CHARACTERS]

1 . . . Internal combustion engine
5 . . . Exhaust pipe
10 . . . NSR
11 . . . Filter
14 . . . Upstream AF sensor
15 . . . Downstream AF sensor
20 . . . ECU
21 . . . Reduction amount calculation part
22 . . . OSC calculation part
24 . . . Filter
25 . . . CCo
26 . . . Temperature sensor

The invention claimed is:

1. An exhaust gas purification system of an internal combustion engine comprising:
a first exhaust gas purification device that is arranged in an exhaust passage of an internal combustion engine and has an oxygen occlusion ability;
a second exhaust gas purification device that is arranged in said exhaust passage at the downstream side of said first exhaust gas purification device and has an oxygen occlusion ability;
an upstream air fuel ratio acquisition unit that acquires the air fuel ratio of an exhaust gas at the upstream side of said first exhaust gas purification device in said exhaust passage;
a downstream air fuel ratio detection unit which is arranged in said exhaust passage at the downstream side of said second exhaust gas purification device, and detects the air fuel ratio of an exhaust gas from said second exhaust gas purification device;
a first air fuel ratio estimation unit that estimates the air fuel ratio of an exhaust gas between said first exhaust gas purification device and said second exhaust gas purification device based on the air fuel ratio of the exhaust gas at the upstream side of said first exhaust gas purification device acquired by said upstream air fuel ratio acquisition unit, and the oxygen occlusion ability of said first exhaust gas purification device in its normal operation;
a second air fuel ratio estimation unit that estimates the air fuel ratio of an exhaust gas at the downstream side of said second exhaust gas purification device based on the air fuel ratio estimated by said first air fuel ratio estimation unit and the oxygen occlusion ability of said second exhaust gas purification device in its normal operation; and a determination unit that determines the degradation of said first exhaust gas purification device and the degradation of said second exhaust gas purification device in a distinguished manner based on the air fuel ratio estimated by said first air fuel ratio estimation unit, the air fuel ratio estimated by said second air fuel ratio estimation unit, and the air fuel ratio detected by said downstream air fuel ratio detection unit.

2. The exhaust gas purification system of an internal combustion engine as set forth in claim 1, wherein said determination unit makes a determination that said second exhaust gas purification device has degraded, in cases where a predetermined air fuel ratio difference derived from a difference between the air fuel ratio estimated by said first air fuel ratio estimation unit and the air fuel ratio detected by said downstream air fuel ratio detection unit is equal to or less than a predetermined threshold.

3. The exhaust gas purification system of an internal combustion engine as set forth in claim 2, wherein said air fuel ratio difference is an integrated value that is obtained by integrating the difference between the air fuel ratio estimated by said first air fuel ratio estimation unit and the air fuel ratio detected by said downstream air fuel ratio detection unit over a predetermined period of time.

4. The exhaust gas purification system of an internal combustion engine as set forth in claim 1, wherein said determination unit makes a determination that said first exhaust gas purification device has degraded, in cases where a predetermined first air fuel ratio difference derived from a difference between the air fuel ratio estimated by said first air fuel ratio estimation unit and the air fuel ratio detected by said downstream air fuel ratio detection unit is larger than a first threshold, and also where a predetermined second air fuel ratio difference derived from a difference between the air fuel ratio estimated by said second air fuel ratio estimation unit and the air fuel ratio detected by said downstream air fuel ratio detection unit is larger than a predetermined second threshold.

5. The exhaust gas purification system of an internal combustion engine as set forth in claim 2, wherein said determination unit makes a determination that said first exhaust gas purification device has degraded, in cases where a predetermined first air fuel ratio difference derived from a difference between the air fuel ratio estimated by said first air fuel ratio estimation unit and the air fuel ratio detected by said downstream air fuel ratio detection unit is larger than a first threshold, and also where a predetermined second air fuel ratio difference derived from a difference between the air fuel ratio estimated by said second air fuel ratio estimation unit and the air fuel ratio detected by said downstream air fuel ratio detection unit is larger than a predetermined second threshold.

6. The exhaust gas purification system of an internal combustion engine as set forth in claim 4, wherein said first air fuel ratio difference is an integrated value that is obtained by integrating the difference between the air fuel ratio estimated by said first air fuel ratio estimation unit and the air fuel ratio detected by said downstream air fuel ratio detection unit over a predetermined period of time; and said second air fuel ratio difference is an integrated value that is obtained by integrating the difference between the air fuel ratio estimated by said second air fuel ratio estimation unit and the air fuel ratio detected by said downstream air fuel ratio detection unit over a predetermined period of time.

7. The exhaust gas purification system of an internal combustion engine as set forth in claim 5, wherein said first air fuel ratio difference is an integrated value that is obtained by integrating the difference between the air fuel ratio estimated by said first air fuel ratio estimation unit and the air fuel ratio detected by said downstream air fuel ratio detection unit over a predetermined period of time; and said second air fuel ratio difference is an integrated value that is obtained by integrating the difference between the air fuel ratio estimated by said second air fuel ratio estimation unit and the air fuel ratio detected by said downstream air fuel ratio detection unit over a predetermined period of time.

8. The exhaust gas purification system of an internal combustion engine as set forth in claim 1, wherein said second exhaust gas purification device is an exhaust gas purification device without a catalyst precious metal carried thereon, and said exhaust gas purification system further comprises:

an oxidation catalyst that is arranged in said exhaust passage at the downstream side of the second exhaust gas purification device, and a temperature detection unit that detects the temperature of said oxidation catalyst, wherein said determination unit determines the degradation of said second exhaust gas purification device based on the temperature of said oxidation catalyst.

9. The exhaust gas purification system of an internal combustion engine as set forth in claim 1, wherein said first exhaust gas purification device is an occlusion reduction type NOx catalyst; and said second exhaust gas purification device is a filter having an oxidization occlusion ability.

10. The exhaust gas purification system of an internal combustion engine as set forth in claim 2, wherein said first exhaust gas purification device is an occlusion reduction type NOx catalyst; and said second exhaust gas purification device is a filter having an oxidization occlusion ability.

11. The exhaust gas purification system of an internal combustion engine as set forth in claim 3, wherein said first exhaust gas purification device is an occlusion reduction type NOx catalyst; and said second exhaust gas purification device is a filter having an oxidization occlusion ability.

12. The exhaust gas purification system of an internal combustion engine as set forth in claim 4, wherein said first exhaust gas purification device is an occlusion reduction type NOx catalyst; and said second exhaust gas purification device is a filter having an oxidization occlusion ability.

13. The exhaust gas purification system of an internal combustion engine as set forth in claim 5, wherein said first exhaust gas purification device is an occlusion reduction type NOx catalyst; and said second exhaust gas purification device is a filter having an oxidization occlusion ability.

14. The exhaust gas purification system of an internal combustion engine as set forth in claim 6, wherein said first exhaust gas purification device is an occlusion reduction type NOx catalyst; and said second exhaust gas purification device is a filter having an oxidization occlusion ability.

15. The exhaust gas purification system of an internal combustion engine as set forth in claim 7, wherein said first exhaust gas purification device is an occlusion reduction type NOx catalyst; and said second exhaust gas purification device is a filter having an oxidization occlusion ability.

16. The exhaust gas purification system of an internal combustion engine as set forth in claim 8, wherein said first exhaust gas purification device is an occlusion reduction type NOx catalyst; and said second exhaust gas purification device is a filter having an oxidization occlusion ability.

\* \* \* \* \*